US012666428B2

(12) United States Patent　　　(10) Patent No.:　US 12,666,428 B2

Kittichokechai et al.　　　(45) Date of Patent:　Jun. 23, 2026

(54) SYSTEMS AND METHODS FOR PUCCH REPETITION

(71) Applicant: TELEFONAKTIEBOLAGET LM ERICSSON (PUBL), Stockholm (SE)

(72) Inventors: Kittipong Kittichokechai, Järfälla (SE); Sorour Falahati, Stockholm (SE); Bikramjit Singh, Raasepori (FI); Jonas Fröberg Olsson, Ljungsbro (SE); Yufei Blankenship, Kildeer, IL (US); Zhenhua Zou, Solna (SE); Mattias Andersson, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 533 days.

(21) Appl. No.: 18/018,766

(22) PCT Filed: Jul. 29, 2021

(86) PCT No.: PCT/IB2021/056941

§ 371 (c)(1),
(2) Date: Jan. 30, 2023

(87) PCT Pub. No.: WO2022/024045

PCT Pub. Date: Feb. 3, 2022

(65) Prior Publication Data

US 2024/0015748 A1　　Jan. 11, 2024

Related U.S. Application Data

(60) Provisional application No. 63/058,135, filed on Jul. 29, 2020.

(51) Int. Cl.
*H04W 72/21*　　(2023.01)
*H04L 1/08*　　(2006.01)

(52) U.S. Cl.
CPC ............... *H04W 72/21* (2023.01); *H04L 1/08* (2013.01)

(58) Field of Classification Search
CPC ........ H04W 72/21; H04L 1/08; H04L 5/0053; H04L 1/0026; H04L 1/1893
See application file for complete search history.

(56) References Cited

U.S. PATENT DOCUMENTS 10,405,305 B2 *　9/2019　Hosseini ............... H04L 5/0048
10,973,038 B2 *　4/2021　Akkarakaran ........ H04L 5/0064
(Continued)

FOREIGN PATENT DOCUMENTS

| CO | 20180004413 A | 4/2018 |
| WO | 2019160846 A1 | 8/2019 |
| WO | 2021176418 A1 | 9/2021 |

*Primary Examiner* — Un C Cho

(57) ABSTRACT

Systems and methods for Physical Uplink Control Channel (PUCCH) repetition are disclosed. In some embodiments, a method performed by a wireless device for transmitting on a PUCCH includes: receiving a configuration indicating PUCCH repetition; and transmitting repeated PUCCH transmissions based on the configuration. Some embodiments provide methods for flexible configuration and indication of PUCCH repetition, including the number of repetitions, based on Uplink Control Information (UCI) type and/or priority of the UCI. Some embodiments can be applied to both slot-based PUCCH and sub-slot based PUCCH, and also short and long PUCCH formats.

19 Claims, 14 Drawing Sheets

```
PUCCH-FormatConfig ::=        SEQUENCE {
    interslotFrequencyHopping     ENUMERATED {enabled}    OPTIONAL, -- Need R
    additionalDMRS                ENUMERATED {true}       OPTIONAL, -- Need R
    maxCodeRate                   PUCCH-MaxCodeRate       OPTIONAL, -- Need R
    nrofSlots                     ENUMERATED {n2,n4,n8}   OPTIONAL, -- Need S
    pi2BPSK                       ENUMERATED {enabled}    OPTIONAL, -- Need R
    simultaneousHARQ-ACK-CSI      ENUMERATED {true}       OPTIONAL  -- Need R
}
```

(56) References Cited

U.S. PATENT DOCUMENTS

| | | | | |
|---|---|---|---|---|
| 11,019,682 | B2 | 5/2021 | Xiong et al. | |
| 11,399,366 | B2 * | 7/2022 | He | H04W 72/21 |
| 11,917,603 | B2 * | 2/2024 | Chen | H04L 5/0051 |
| 12,177,849 | B2 * | 12/2024 | Zhang | H04L 5/0057 |
| 2019/0306922 | A1 * | 10/2019 | Xiong | H04W 72/21 |
| 2020/0154427 | A1 | 5/2020 | Choi et al. | |
| 2021/0368508 | A1 * | 11/2021 | Chen | H04L 1/0013 |
| 2022/0006575 | A1 * | 1/2022 | Cozzo | H04L 1/0073 |
| 2022/0086032 | A1 | 3/2022 | Park | |
| 2022/0104224 | A1 | 3/2022 | Choi et al. | |
| 2023/0076577 | A1 * | 3/2023 | Li | H04L 1/1861 |
| 2023/0116002 | A1 * | 4/2023 | Salah | H04W 72/23 |
| | | | | 370/329 |

* cited by examiner

ONE RESOURCE ELEMENT

Δf = 15 kHz

ONE OFDM SYMBOL
INCLUDING CYCLIC PREFIX

```
PUCCH-FormatConfig ::=              SEQUENCE {
    interslotFrequencyHopping           ENUMERATED {enabled}        OPTIONAL,   -- Need R
    additionalDMRS                      ENUMERATED {true}           OPTIONAL,   -- Need R
    maxCodeRate                         PUCCH-MaxCodeRate           OPTIONAL,   -- Need R
    nrofSlots                           ENUMERATED {n2,n4,n8}       OPTIONAL,   -- Need S
    pi2BPSK                             ENUMERATED {enabled}        OPTIONAL,   -- Need R
    simultaneousHARQ-ACK-CSI            ENUMERATED {true}           OPTIONAL,   -- Need R
}
```

FIG. 3

```
SchedulingRequestResourceConfig-v16xy ::=    SEQUENCE {
    phy-PriorityIndex-r16         ENUMERATED {p0, p1}     OPTIONAL,    -- Need M
    ...
}
```

1200

1212

SYSTEMS AND METHODS FOR PUCCH REPETITION

RELATED APPLICATIONS

This application is a national phase application of International Patent Application No. PCT/IB2021/056941, filed Jul. 29, 2021, which claims the benefit of provisional patent application Ser. No. 63/058,135, filed Jul. 29, 2020, the disclosures of which are hereby incorporated herein by reference in their entirety.

TECHNICAL FIELD

The present disclosure relates to transmission repetition.

BACKGROUND

New Radio (NR) standard in Third Generation Partnership Project (3GPP) is designed to provide service for multiple use cases such as enhanced Mobile Broadband (eMBB), Ultra-Reliable and Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR in addition to transmission in a slot, a mini-slot transmission is also allowed to reduce latency. A mini-slot is a concept that is used in scheduling and in downlink (DL) a min-slot can consist of 2, 4 or 7 Orthogonal Frequency Division Multiplexing (OFDM) symbols, while in uplink (UL) a mini-slot can be any number of 1 to 14 OFDM symbols. It should be noted that the concepts of slot and mini-slot are not specific to a specific service meaning that a mini-slot may be used for either eMBB, URLLC, or other services. FIG. 1 illustrates an exemplary radio resource in NR.

Downlink Control Information

In 3GPP NR standard, Downlink Control Information (DCI) which is transmitted in Physical Downlink Control Channel (PDCCH), is used to indicate the DL data related information, UL related information, power control information, slot format indication, etc. There are different formats of DCI associated with each of these control signals and the User Equipment (UE) identifies them based on different Radio Network Temporary Identifiers (RNTIs).

A UE is configured by higher layer signaling to monitor for DCIs in different resources with different periodicities, etc. DCI formats 1_0, 1_1, and 1_2 are used for scheduling DL data which is sent in Physical Downlink Shared Channel (PDSCH), and includes time and frequency resources for DL transmission, as well as modulation and coding information, HARQ (hybrid automatic repeat request) information, etc.

In case of DL Semi-Persistent Scheduling (SPS) and UL configured grant type 2, part of the scheduling including the periodicity is provided by the higher layer configurations, while the rest of scheduling information such as time domain and frequency domain resource allocation, modulation and coding, etc., are provided by the DCI in PDCCH.

Uplink Control Information

Uplink Control Information (UCI) is a control information sent by a UE to a New Radio Base Station (gNB). It consists of:

Hybrid-ARQ Acknowledgement (HARQ-ACK) which is a feedback information corresponding to the received downlink transport block whether the transport block reception is successful or not, Channel State Information (CSI) related to downlink channel conditions which provides gNB with channel-related information useful for DL scheduling, including information for multi-antenna and beamforming schemes, and Scheduling Request (SR) which indicates a need of UL resources for UL data transmission UCI is typically transmitted on Physical Uplink Control Channel (PUCCH). However, if a UE is transmitting data on the PUSCH with a valid PUSCH resource overlapping with PUCCH, UCI can be multiplexed with UL data and transmitted on PUSCH instead, if the timeline requirements for UCI multiplexing are met.

Physical Uplink Control Channel

PUCCH is used by a UE to transmit HARQ-ACK feedback message corresponding to the reception of DL data transmission. It is also used by the UE to send CSI or to request for an uplink grant for transmitting UL data.

In NR, there exist multiple PUCCH formats supporting different UCI payload sizes. PUCCH formats 0 and 1 support UCI up to 2 bits, while PUCCH formats 2, 3, and 4 can support UCI of more than 2 bits. In terms of PUCCH transmission duration, PUCCH formats 0 and 2 are considered short PUCCH formats supporting PUCCH duration of 1 or 2 OFDM symbols, while PUCCH formats 1, 3, and 4 are considered as long formats and can support PUCCH duration from 4 to 14 symbols.

HARQ Feedback

The procedure for receiving downlink transmission is that the UE first monitors and decodes a PDCCH in slot n which points to a DL data scheduled in slot $n+K_0$ slots ($K_0$ is larger than or equal to 0). The UE then decodes the data in the corresponding PDSCH. Finally based on the outcome of the decoding the UE sends an acknowledgement of the correct decoding (ACK) or a Negative Acknowledgement (NACK) to the gNB at time slot $n+K_0+K_1$ (in case of slot aggregation $n+K_0$ would be replaced by the slot where PDSCH ends). Both of $K_0$ and $K_1$ are indicated in the DCI. The resources for sending the acknowledgement are indicated by PUCCH resource indicator (PRI) field in the DCI which points to one of PUCCH resources that are configured by higher layers.

Depending on DL/UL slot configurations, or whether carrier aggregation, or per Code-Block Group (CBG) transmission used in the DL, the feedback for several PDSCHs may need to be multiplexed in one feedback. This is done by constructing HARQ-ACK codebooks. In NR, the UE can be configured to multiplex the A/N bits using a semi-static codebook or a dynamic codebook.

Type 1 or semi-static codebook consists of a bit sequence where each element contains the A/N bit from a possible allocation in a certain slot, carrier, or Transport Block (TB). When the UE is configured with CBG and/or Time-Domain Resource Allocation (TDRA) table with multiple entries, multiple bits are generated per slot and TB (see below). It is important to note that the codebook is derived regardless of the actual PDSCH scheduling. The size and format of the semi-static codebook is preconfigured based on the mentioned parameters. The drawback of semi-static HARQ ACK codebook is that the size is fixed, and regardless of whether there is a transmission or not a bit is reserved in the feedback matrix.

On the case when a UE has a TDRA table with multiple time-domain resource allocation entries configured: The table is pruned (i.e., entries are removed based on a specified algorithm) to derive a TDRA table that only contains non-overlapping time-domain allocations.

One bit is then reserved in the HARQ Code-Block (CB) for each non-overlapping entry (assuming a UE is capable of supporting reception of multiple PDSCH in a slot).

To avoid reserving unnecessary bits in a semi-static HARQ codebook, in NR a UE can be configured to use a type 2 or dynamic HARQ codebook, where an A/N bit is present only if there is a corresponding transmission sched- uled. To avoid any confusion between the gNB and the UE, on the number of PDSCHs that the UE has to send a feedback for, a counter Downlink Assignment Indicator (DAI) field exists in DL assignment, which denotes accu- mulative number of {serving cell, PDCCH occasion} pairs in which a PDSCH is scheduled to a UE up to the current PDCCH. In addition to that, there is another field called total DAI, which when present shows the total number of {serv- ing cell, PDCCH occasion} up to (and including) all PDCCHs of the current PDCCH monitoring occasion. The timing for sending HARQ feedback is determined based on both PDSCH transmission slot with reference to PDCCH slot ($K_0$) and the PUCCH slot that contains HARQ feedback ($K_1$).

FIG. 2 illustrates the timeline in a simple scenario with two PDSCHs and one feedback. In this example there is in total four PUCCH resources configured, and the PRI indi- cates PUCCH 2 to be used for HARQ feedback. How PUCCH 2 is selected from 4 PUCCH resources based on the procedure in Rel-15 is explained.

In NR Rel-15, a UE can be configured with maximum four PUCCH resource sets for transmission of HARQ-ACK information. Each set is associated with a range of UCI payload bits including HARQ-ACK bits. The first set is always associated to one or two HARQ-ACK bits and hence includes only PUCCH format 0 or 1 or both. The range of payload values (minimum of maximum values) for other sets, if configured, is provided by configuration except the maximum value for the last set where a default value is used, and the minimum value of the second set being 3. The first set can include maximum 32 PUCCH resources of PUCCH format or 1. Other sets can include maximum eight bits of format 2 or 3 or 4.

As described previously, the UE determines a slot for transmission of HARQ-ACK bits in a PUCCH correspond- ing to PDSCHs scheduled or activated by DCI via $K_1$ value provided by configuration or a field in the corresponding DCI. The UE forms a codebook from the HARQ-ACK bits with associated PUCCH in a same slot via corresponding $K_1$ values.

The UE determines a PUCCH resource set that the size of the codebook is within the corresponding range of payload values associated to that set.

The UE determines a PUCCH resource in that set if the set is configured with maximum eight PUCCH resources, by a field in the last DCI associated to the corresponding PDSCHs. If the set is the first set and is configured with more than eight resources, a PUCCH resource in that set is determined by a field in the last DCI associated to the corresponding PDSCHs and implicit rules based on the Control Channel Element (CCE).

A PUCCH resource for HARQ-ACK transmission can overlap in time with other PUCCH resources for CSI and/or SR transmissions as well as PUSCH transmissions in a slot. In case of overlapping PUCCH and/or PUSCH resources, first the UE resolves overlapping between PUCCH resources, if any, by determining a PUCCH resource carrying the total UCI (including HARQ-ACK bits) such that the UCI multiplexing timeline requirements are met. There might be partial or completely dropping of CSI bits, if any, to multiplex the UCI in the determined PUCCH resource. Then, the UE resolves overlapping between PUCCH and PUSCH resources, if any, by multiplexing the UCI on the PUSCH resource if the timeline requirements for UCI multiplexing are met.

PUCCH Repetition Procedure in Rel-15

In Rd-15 PUCCH repetition over multiple slots are sup- ported. This is useful e.g., for increased coverage. Only long PUCCH formats, namely formats 1, 3, and 4 are supported. Number of repetitions (2, 4, or 8 slots) is semi-statically configured by a higher layer parameter nrofSlots in PUCCH- FormatConfig in the PUCCH-config IE (see FIG. 3 below). The same resource allocation (e.g., same number of con- secutive symbols, same starting symbol) is used for each repetition over multiple slots. See Section 9.2.6 in TS 38.213 for the complete description.

The semi-static configuration of the number of PUCCH repetitions by nrofSlots in PUCCH-FormatConfig is done per PUCCH format separately. Once it is configured, it is applied to all PUCCH resources of that particular format. FIG. 3 illustrates an Radio Resource Control (RRC) param- eter for indicating PUCCH repetition across multiple slots.

--- nrofSlots
Number of slots with the same PUCCH F1, F3 or F4. When the field is absent the UE applies the value n1. The field is not applicable for format 2. See TS 38.213 [13], clause 9.2.6.

---

Sub-Slot HARO-ACK

In NR Rel-16, an enhancement on HARQ-ACK feedback is made to support more than one PUCCH carrying HARQ- ACK in a slot for supporting different services and for possible fast HARQ-ACK feedback for URLLC. This leads to an introduction of new HARQ-ACK timing in a unit of sub-slot, i.e., $K_1$ indication in a unit of sub-slot. Sub-slot configurations for PUCCH carrying HARQ-ACK can be configured from the two options, namely "2-symbol*7" and "7-symbol*2" for the sub-slot length of two symbols and seven symbols, respectively. The indication of $K_1$ is the same as that of Rd-15, that is, $K_1$ is indicated in the DCI scheduling PDSCH. To determine the HARQ-ACK timing, there exists an association of PDSCH to sub-slot configu- ration in that if the scheduled PDSCH ends in sub-slot n, the corresponding HARQ-ACK is reported in sub-slot n+K1. In a sense, sub-slot based HARQ-ACK timing works similarly to that of Rel-15 slot-based procedure by replacing the unit of $K_1$ from slot to sub-slot.

There exist some limitations on PUCCH resources for sub-slot HARQ-ACK. That is, only one PUCCH resource configuration is used for all sub-slots in a slot. Moreover, any PUCCH resource for sub-slot HARQ-ACK cannot cross sub-slot boundaries.

FIG. 4 shows an example where each PDSCH is associ- ated with a certain sub-slot for HARQ feedback through the use of a $K_1$ value in units of sub-slots.

Priority Indication of HARQ-ACK

In Rel-16, two-level PHY priority can be indicated in the DCI for HARQ-ACK corresponding to a dynamically scheduled PDSCH or RRC-configured for HARQ-ACK corresponding to DL SPS. This priority indication can be used to determine the priority of the HARQ-ACK codebook for collision handling. NR Rel-16 supports up to two HARQ-ACK codebooks with different priorities to be simultaneously constructed. This includes one being slot-based and one being sub-slot-based, both being slot-based, or both being sub-slot-based.

Priority Indication of SR

In Rel-16, two-level PHY priority of SR can be configured by a higher layer parameter phy-PriorityIndex in SchedulingRequestResourceConfig (see FIG. 5). This priority indication is used to determine the high or low priority of scheduling request resource and used for PHY prioritization/multiplexing handling.

--- phy-PriorityIndex
Indicates whether this scheduling request resource is high or low priority in PHY prioritization/multiplexing handling (see TS 38.213 [13], clause 9.2.4). Value p0 indicates low priority and value p1 indicates high priority.

---

Improved systems and methods for PUCCH repetition are needed.

SUMMARY

Systems and methods for Physical Uplink Control Channel (PUCCH) repetition are disclosed. In some embodiments, a method performed by a wireless device for transmitting on a PUCCH includes: receiving a configuration indicating PUCCH repetition; and transmitting repeated PUCCH transmissions based on the configuration. The proposed solutions provide methods for flexible configuration and indication of PUCCH repetition, including the number of repetitions, based on Uplink Control Information (UCI) type and/or priority of the UCI. It can be applied to both slot-based PUCCH and sub-slot based PUCCH, and also short and long PUCCH formats.

In some embodiments, wherein the configuration includes one or more of: the number of repetitions, whether the repetition is based on UCI type, and whether the repetition is based on priority of the UCI.

In some embodiments, the configuration applies to one or more of: slot-based PUCCH and sub-slot based PUCCH.

In some embodiments, the configuration applies to one or more of: short PUCCH formats and long PUCCH formats.

In some embodiments, the configuration can include a new higher layer parameters for PUCCH repetition for each UCI type separately.

In some embodiments, if more than one parameter is configured with different values for the number of repetitions, PUCCH repetition for PUCCH carrying multiple UCI types is performed according to the largest value.

In some embodiments, if more than one parameter is configured with different values for the number of repetitions, PUCCH repetition for PUCCH carrying multiple UCI types is performed according to the smallest value.

In some embodiments, the unit of the values of parameters can be slot or sub-slot.

In some embodiments, there is a predefined restriction where only certain PUCCH formats are applied.

In some embodiments, the parameter for PUCCH repetition for certain UCI type also indicates the applicable PUCCH format(s).

In some embodiments, PUCCH repetition for UCI type with the number of repetitions is performed based on an implicit rule.

In some embodiments, PUCCH repetition is associated to low priority or high priority, and PUCCH repetition can be determined based on a default rule or indicated by higher layers.

In some embodiments, if PUCCH repetition associated with low priority UCI collides/overlaps with another PUCCH associated with high priority UCI, the PUCCH repetitions with low priority UCI in the overlapped slots/sub-slots are dropped.

In some embodiments, the wireless device operates in a New Radio (NR) network.

Certain embodiments may provide one or more of the following technical advantage(s). The proposed solutions allow for more flexible configuration and indication of PUCCH repetition which is not tied to a specific PUCCH format. Some embodiments can be applied to both slot based and sub-slot based PUCCH, and also any PUCCH formats.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates a Radio Resource Control (RRC) parameter for indicating Physical Uplink Control Channel (PUCCH) repetition across multiple slots;

DETAILED DESCRIPTION

Figure 1:
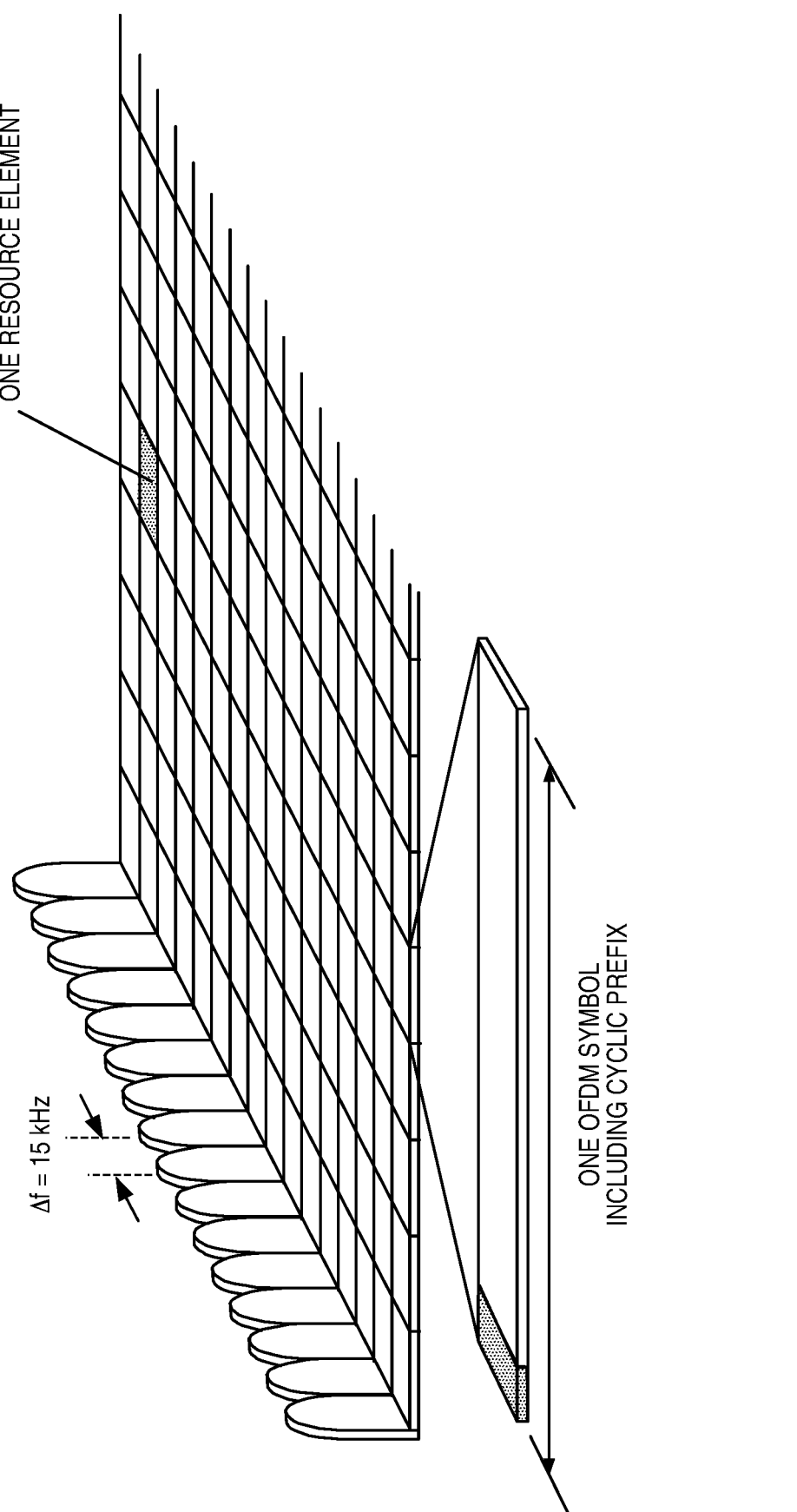
FIG. 1 illustrates an exemplary radio resource in New Radio (NR)
Figure 2:
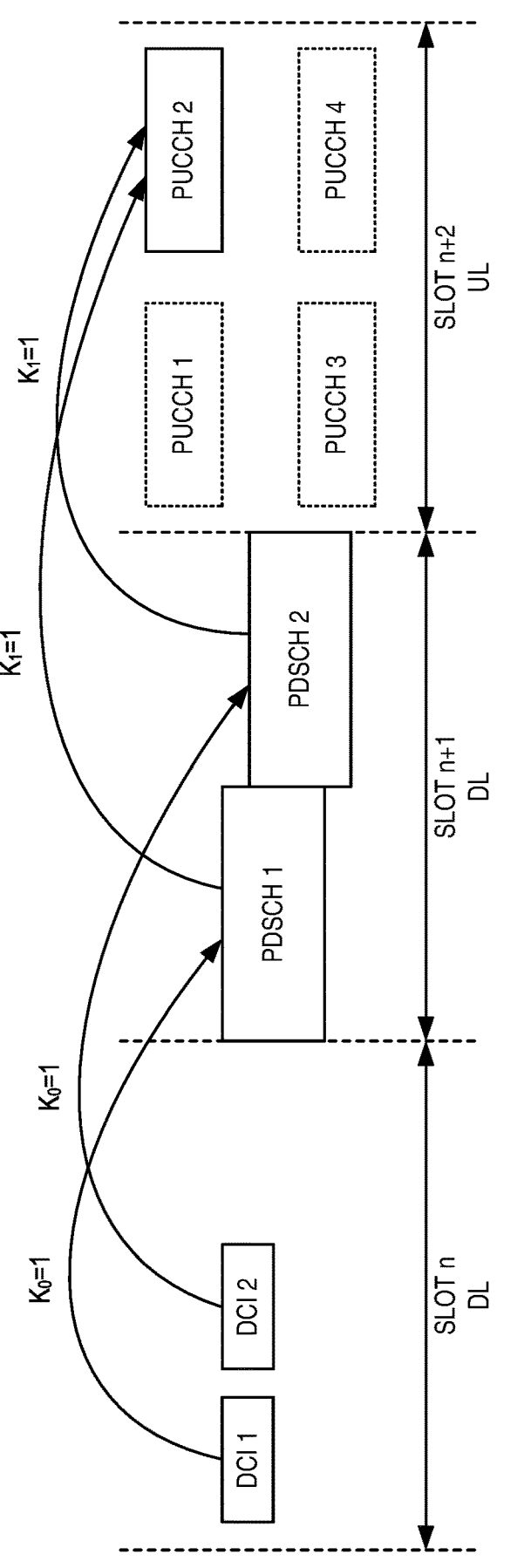
FIG. 2 illustrates the timeline in a simple scenario with two Physical Downlink Shared Channels (PDSCHs) and one feedback.
Figure 4:
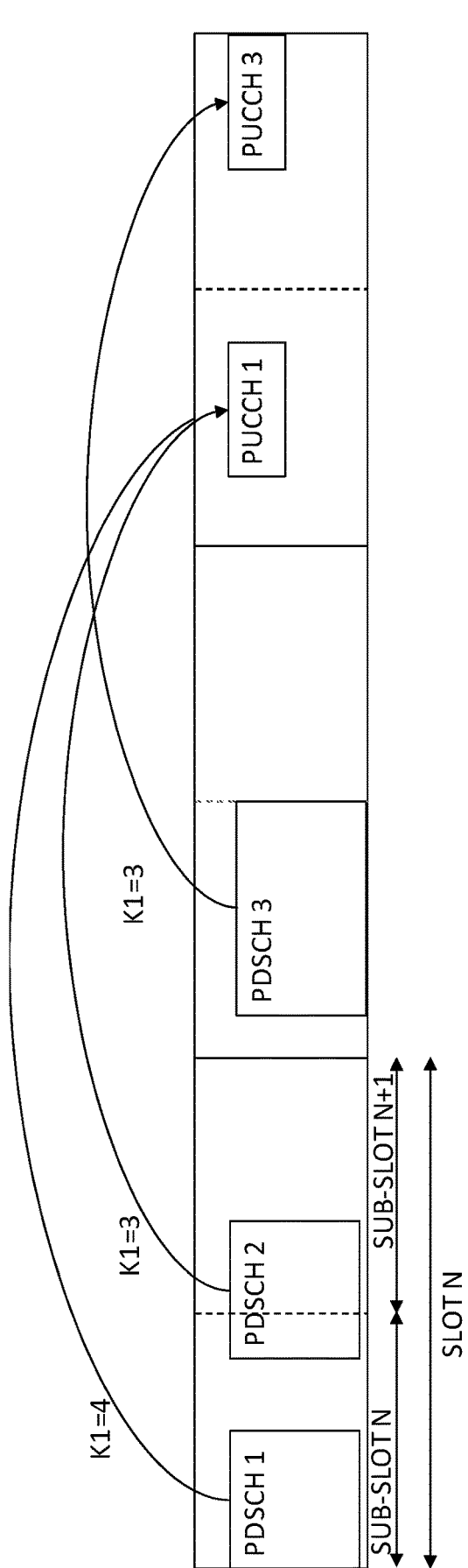
FIG. 4 shows an example where each PDSCH is associated with a certain sub-slot for Hybrid Automatic Repeat Request (HARQ) feedback through the use of a K1 value in units of sub-slots.
Figure 5:
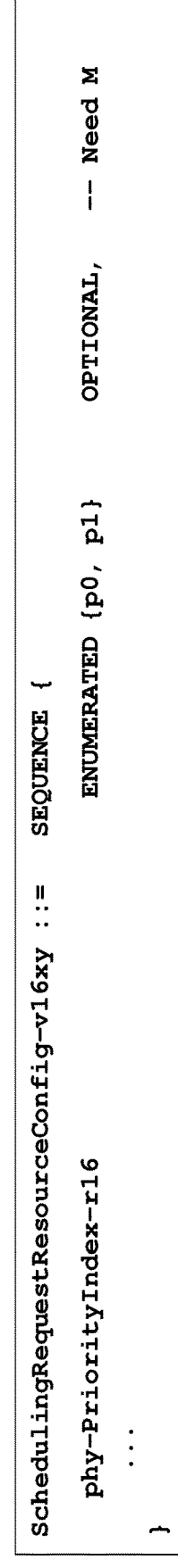
FIG. 5 illustrates that two-level PHY priority of Scheduling Request (SR) can be configured by a higher layer parameter phy-PriorityIndex in SchedulingRequestResourceConfig.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 6:
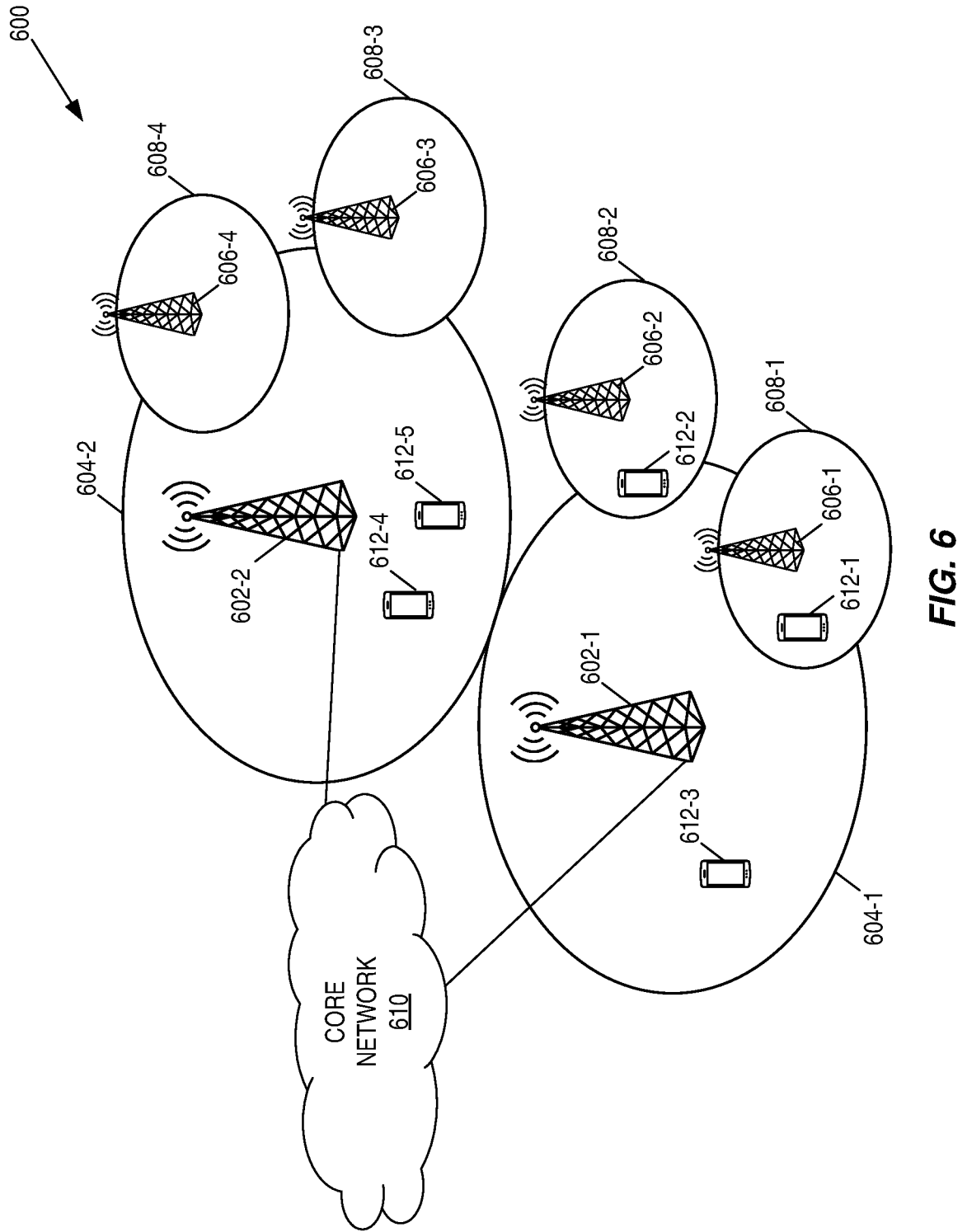
FIG. 6 illustrates one example of a cellular communications system 600 in which embodiments of the present disclosure may be implemented.

FIG. 6 illustrates one example of a cellular communications system 600 in which embodiments of the present disclosure may be implemented. In the embodiments described herein, the cellular communications system 600 is a 5G system (5GS) including a Next Generation RAN (NG-RAN) and a 5G Core (5GC). In this example, the RAN includes base stations 602-1 and 602-2, which in the 5GS include NR base stations (gNBs) and optionally next generation eNBs (ng-eNBs) (e.g., LTE RAN nodes connected to the 5GC), controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which in the 5G System (5GS) is referred to as the 5GC. The base stations 602 (and optionally the low power nodes 606) are connected to the core network 610.

The base stations 602 and the low power nodes 606 provide service to wireless communication devices 612-1 through 612-5 in the corresponding cells 604 and 608. The wireless communication devices 612-1 through 612-5 are generally referred to herein collectively as wireless communication devices 612 and individually as wireless communication device 612. In the following description, the wireless communication devices 612 are oftentimes UEs, but the present disclosure is not limited thereto.

There currently exist certain challenges. The existing indication of the number of Physical Uplink Control Channel (PUCCH) repetitions is only done by semi-static configuration where it is configured per PUCCH format and applied to all PUCCH resources of that format. This is restrictive in the sense that all PUCCH corresponding to that format is subjected to PUCCH repetition regardless of Uplink Control Information (UCI) type (Hybrid Automatic Repeat Request Acknowledgement (HARQ-ACK), Channel State Information (CSI), or Scheduling Request (SR)). Moreover, once configured, it is also applied to any PUCCH resources of that format, regardless of priority of UCI contained in the PUCCH. Lastly, the existing PUCCH repetition procedure is limited to only long PUCCH formats 1, 3, or 4. As such, improved systems and methods for PUCCH repetition are needed.

Systems and methods for PUCCH repetition are disclosed. In some embodiments, a method performed by a wireless device for transmitting on a PUCCH includes: receiving a configuration indicating PUCCH repetition; and transmitting repeated PUCCH transmissions based on the configuration. The proposed solutions provide methods for flexible configuration and indication of PUCCH repetition, including the number of repetitions, based on UCI type and/or priority of the UCI. It can be applied to both slot-based PUCCH and sub-slot based PUCCH, and also short and long PUCCH formats.

The following set of embodiments is described in general and can be applied to both PUCCH repetitions over multiple sub-slots and multiple slots. They can also be applied to any PUCCH formats, both short and long formats. For PUCCH carrying UCI containing HARQ-ACK, it applies to both HARQ-ACK for dynamically scheduled PDSCH and for downlink (DL) Semi-Persistent Scheduling (SPS).

Figures 7, 8:
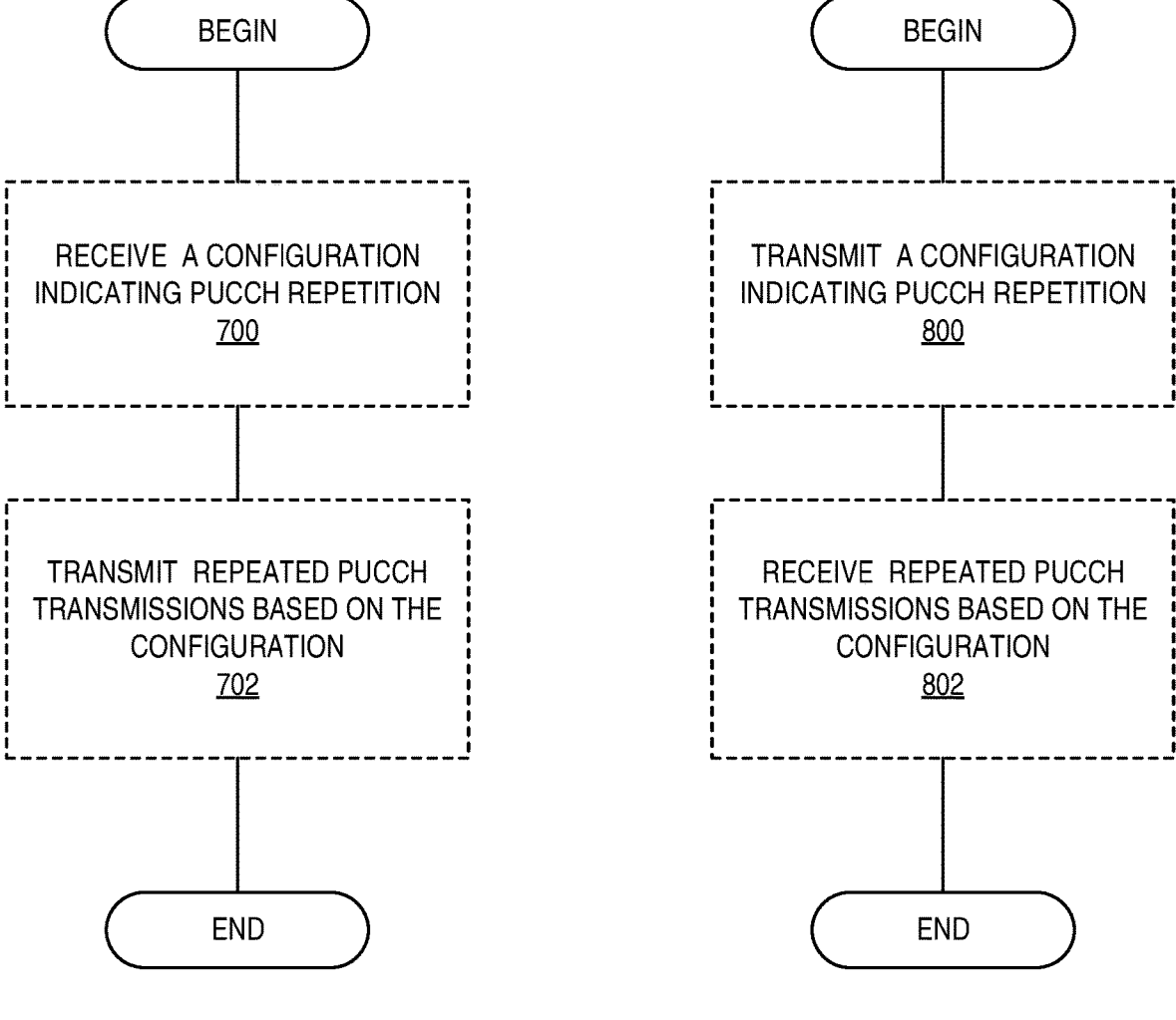
FIG. 7 illustrates a method performed by a wireless device for transmitting on a PUCCH, according to some embodiments of the present disclosure.
FIG. 8 illustrates a method performed by a base station for configuring PUCCH transmissions, according to some embodiments of the present disclosure.

FIG. 7 illustrates a method performed by a wireless device for transmitting on a PUCCH, according to some embodiments of the present disclosure. The method includes one or more of: receiving a configuration indicating PUCCH repetition (step 700); and transmitting repeated PUCCH transmissions based on the configuration (702). Embodiments of the method as described herein allow for more flexible configuration and indication of PUCCH repetition without being tied to a specific PUCCH format. It can be applied to both slot based and sub-slot based PUCCH, and also any PUCCH formats. This may provide for lower latency communication between a wireless device and a network node in subsequent communication.

FIG. 8 illustrates a method performed by a base station for configuring PUCCH transmissions, according to some embodiments of the present disclosure. The method includes one or more of: transmitting a configuration indicating PUCCH repetition (step 800); and receiving repeated PUCCH transmissions based on the configuration (step 802). Embodiments of the method as described herein allow for more flexible configuration and indication of PUCCH repetition without being tied to a specific PUCCH format. It can be applied to both slot based and sub-slot based PUCCH, and also any PUCCH formats. This may provide for lower latency communication between a wireless device and a network node in subsequent communication.

In some embodiments, this allows for more flexible configuration and indication of PUCCH repetition which is not tied to a specific PUCCH format. Some embodiments can be applied to both slot based and sub-slot based PUCCH, and also any PUCCH formats.

PUCCH Repetition Based on UCI Type

Repetition Indication by Radio Resource Control (RRC) for Each UCI Type

In one non-limiting embodiment, PUCCH repetition is performed for PUCCH containing certain UCI type according to a higher layer parameter configured for that UCI type.

In one non-limiting embodiment, new higher layer (RRC) parameters for PUCCH repetition are introduced for each UCI type separately. The parameters apply per PUCCH format defined within one RRC IE PUCCH-Config. For example, the following RRC parameters are introduced for indicating PUCCH repetition and the corresponding number of repetitions for each UCI type (note that the parameter names listed here are only exemplary):

a new RRC parameter nrSRrepetition in SchedulingRequestResourceConfig IE or in PUCCH config IE, indicating the number of repetitions for PUCCH carrying SR a new parameter nrCSIrepetition in PUCCH-CSI-Resource in CSI-ReportConfig IE or in PUCCH config IE, indicating number of repetitions for PUCCH carrying CSI a new parameter nrHARQACKrepetition in PUCCH config IE, indicating number of repetitions for PUCCH carrying HARQ-ACK PUCCH repetition is performed for a PUCCH transmission when PUCCH carries UCI containing at least UCI type(s) indicated by the corresponding parameter(s). For example, if nrHARQACKrepetition is configured to two slots, UE performs PUCCH repetition over two slots whenever a PUCCH carrying UCI with HARQ-ACK.

In one non-limiting embodiment, if more than one of the above RRC parameters is configured with different values for the number of repetitions, PUCCH repetition for PUCCH carrying multiple UCI types is performed according to the largest value. In another version, the smallest number is used.

For example, if both nrHARQACKrepetition and nrSRrepetition are configured with values two slots and four slots, respectively, UE performs PUCCH repetition for PUCCH carrying both HARQ-ACK and SR over four slots, corresponding to the largest value of the two.

The unit of the values of above parameters can be slot or sub-slot. The unit can also depend on the associated PUCCH-config of the PUCCH resource, i.e., whether sub-slot is configured for that PUCCH-config. If PUCCH resource for PUCCH repetition is associated with PUCCH-config which contains subslotLengthForPUCCH-r16, the sub-slot is used as a unit, otherwise, the unit is slot.

In another version of the above embodiment, new RRC parameters for PUCCH repetition are introduced for a group of UCI types. If a parameter for a group of UCI types is configured, PUCCH repetition is performed for a PUCCH transmission when PUCCH carries UCI containing UCI types indicated by the corresponding parameter.

In one non-limiting embodiment, PUCCH repetition for certain UCI type is performed for any PUCCH containing that UCI type, regardless of the PUCCH format.

In another version of the above embodiment, there is a predefined restriction where only certain PUCCH formats are applied, e.g., only long PUCCH formats 1, 3, or 4.

In yet another version of the above embodiment, the RRC parameter for PUCCH repetition for certain UCI type also indicates the applicable PUCCH format(s).

In one non-limiting embodiment, if both parameters (nrSRrepetition/nrCSIrepetition/nrHARQACKrepetition) and nrofSlots for the format are configured, UE ignores nrofSlots when performing PUCCH repetition for the UCI type.

In one non-limiting embodiment, the same set of Physical Resource Block (PRB) and time-domain symbol indices in a slot/sub-slot are used for each of the PUCCH repetitions across multiple slots/sub-slots. Alternatively, different time and frequency resources for different repetitions of the PUCCH transmission are indicated or configured to the UE.

In another non-limiting embodiment, the repetition is firstly performed by duplicating the indicated number of repeated UCI and UE multiplexes each of the UCI on the subsequent PUCCH resources in the next (sub)-slots. The repetition in this case is a configurable parameter per UCI type within each PUCCH-Config. It is not relevant with the PUCCH format since UE might use a different PUCCH format in the next repetition occasion due to that the UCI bits is changed.

By the above approach, the network can configure a different number of repetitions per each UCI type and the UE transmits the indicated number of repetitions. This can be useful to save uplink control overhead while keeping the intended uplink control channel reliability. In one example, the network can configure a higher number of repeated HARQ-ACK while a smaller number of repetitions for CSI report, since it is crucial to keep the data transmission in DL, for example, for UE to receive RRC (re)configuration.

Repetition Indication for UCI Type Based on the Existing Parameter nrofSlots

In one non-limiting embodiment, PUCCH repetition for UCI type with the number of repetitions according to nrofSlots is performed based on an implicit rule. For example, a rule can be that PUCCH repetition is performed only if the UCI contains HARQ-ACK. As another example, the run may be that PUCCH repetition is performed when the PUCCH carries certain UCI type(s) or with certain priority, which may be indicated in the DCI.

In one non-limiting embodiment, PUCCH repetition for UCI type with the number of repetitions according to nrofSlots is performed based on an explicit indication by new RRC parameters.

In one version, new RRC parameters for each UCI type, e.g., repetitionForHARQACK, repetitionForSR, repention-ForCSI (note that the parameter names listed here are only exemplary) are introduced to indicate that PUCCH repetition with the number of repetitions according to nrofSlots is applied to PUCCH carrying UCI containing that UCI type.

In another version, new RRC parameters for a group of UCI types are introduce to that PUCCH repetition with the number of repetitions according to nrofSlots is applied to PUCCH carrying UCI containing a group of UCI types as indicated by the corresponding parameter.

In the above embodiment, new RRC parameters can be configured in PUCCH config IE, SchedulingRequestResourceConfig IE, or CSI-ReportConfig IE.

For example, if nrofSlots is configured to two slots for PUCCH format 1, and repetitionForHARQACK is configured as 'enabled', UE performs PUCCH repetition over two slots whenever a PUCCH format 1 carrying UCI with HARQ-ACK. For PUCCH format 1 carrying SR only, no PUCCH repetition is performed.

In one non-limiting embodiment, PUCCH repetition indicated by higher layer parameter nrofSlots in PUCCH-FormatConfig is also supported for short PUCCH formats 0 and 2.

PUCCH Repetition Based on Priority

The following embodiments describe methods for PUCCH repetitions for a given priority. In the following, PUCCH repetition is associated to the high priority for convenient. The methods are equivalently applicable for the case when PUCCH repetition is associated to the low priority. Whether PUCCH repetition is associated to low priority or high priority, can be determined based on default rule or indicated by higher layers. In one non-limiting set of embodiments, the priority is indicated in the Downlink Control Information (DCI) scheduling the UCI.

In one non-limiting set of embodiments the priority depends on the UCI type. For example, HARQ ACK could have higher priority than SR that has higher priority than CSI part 1 that has higher priority than CSI part 2.

In one non-limiting set of embodiments there is both a priority indicated by DCI or RRC, and different UCI types. In this case if the priority indicated by DCI or RRC is higher for a first UCI than for a second UCI, then the first UCI has higher priority. If the priority indicated by DCI or RRC is the same, then priority is determined by UCI type, e.g., by the order in the previous embodiment.

In one non-limiting embodiment, PUCCH repetition is performed only for PUCCH carrying UCI associated with high priority (dynamic indication of priority, or semi-statically configured priority).

In one non-limiting embodiment, when PUCCH repetition for UCI type is indicated by RRC parameter for the (group of) UCI type, PUCCH repetition is performed only for PUCCH carrying that (group of) UCI which is associated with high priority.

In one non-limiting embodiment, PUCCH repetition is not performed for PUCCH carrying UCI associated with low priority. This means repetitions only occur in the cases with (a) high priority or (b) 'no' priority (i.e., when priority field is not configured). For example, the 'no priority' can be associated with HARQ codebook transmission with Type-3 HARQ-ACK codebook or a so called one-shot HARQ-ACK feedback.

In one non-limiting embodiment, the PUCCH repetition carrying HARQ-ACK is subject to whether it corresponds to retransmission or initial transmission of PDSCH for a given HARQ process. For instance, the initial transmission can be subjected to fewer HARQ feedback repetitions and the retransmission can be subjected to larger repetitions, or vice-versa. In one extension, the transmission (which can be retransmission) at the end of latency budget for the HARQ process can be associated with fewer or zero HARQ feedback repetitions.

In one non-limiting embodiment, if there are N levels of priority associated with PUCCH, then these priority levels (individual or sub-set (group) of priority levels) map to the number of PUCCH repetitions. For example, priority level 1 is associated with single repetition, priority level 2 and 3 associated with four repetitions, etc.

For the above embodiments,

Priority of HARQ-ACK can be indicated by the priority indicator field in the DCI format 1_1/1_2, or semi-statically configured parameter indicating the corresponding HARQ-ACK codebook for SPS PDSCH Priority of SR can be indicated by the parameter phy-PriorityIndex or schedulingRequestPriority in SchedulingRequestResourceConfig IE Priority of CSI can be semi-statically configured in CSI-ReportConfig IE, dynamically indicated by a priority indicator field in DCI format 0_1 or 0_2 if there is no scheduled Uplink (UL) data, or defined as the CSI containing certain CSI type, e.g., CSI containing Channel Quality Indication (CQI).

PUCCH Repetition Based on Dynamic Indication

Some solutions for dynamic indication of PUCCH repetition are described. Although some of the embodiments are described for sub-slot based PUCCH, they can also be applicable for slot-based PUCCH repetition over multiple slots.

In one non-limiting embodiment, sub-slot PUCCH repetitions are indicated dynamically in the DCI scheduling PDSCH or activating DL SPS.

In one version of the above embodiment, an indication is through a new separate field in the DCI formats scheduling PDSCH or activating DL SPS, e.g., formats 1_0, 1_1, and 1_2. The indication can include the number of repetitions. In one embodiment, the new separate field is added to non-fallback DCI formats only (e.g., 1_1 and 1_2), whereas for the fallback DCI format, the number of sub-slot PUCCH repetition is either pre-defined, or provided via an RRC parameter.

In another embodiment, an RRC parameter is configured to provide a set of possible values for the number of sub-slot repetitions, for example, nrofSubSlotsSet of {1, 2, 4, 8}. Then a DCI field selects one value from the set of possible values, for example, a 2-bit DCI field "nrofSubSlot Indicator" can select one value from four possible values. Additionally, the presence, and/or the field size of "nrofSubSlot Indicator" can be RRC configurable, for example, the DCI field size is configurable to be 0, 1, or 2 bits.

In another version of the above embodiment, an indication is through the PUCCH Resource Indicator (PRI) field by selecting a specific PUCCH resource entry from the configured PUCCH resources. That is, a new RRC parameter, e.g., repetitionNum is added to the PUCCH-Resource which forms PUCCH resources in a PUCCH resource set. If PUCCH-ResourceId containing such repetition number is selected by the PRI in the DCI, PUCCH transmission is repeated by the indicated number of times.

In one non-limiting embodiment, the value of repetition number can be in the unit of sub-slot or slot. Accordingly, PUCCH transmission is repeated over multiple sub-slots or slots depending on the indication. For example, if the PUCCH configuration is provided with sub-slot configuration, e.g., subslotLengthForPUCCH-r16 is set to 'n2' or 'n7', then the repetition is interpreted as repeating across adjacent, available, sub-slots. Otherwise, if sub-slot configuration is absent (thus using the default of slot-based PUCCH), then the repetition is interpreted as repeating across adjacent, available, slots.

Some examples of the solutions for dynamic indication of PUCCH repetition include:

Introducing a new DCI field for indicating the number of repetitions for PUCCH

Introducing a higher layer parameter indicating the number of repetitions for each PUCCH resource, where PUCCH repetition can be indicated by a PUCCH resource indicator (PRI) field in the DCI selecting a specific PUCCH resource with configured number of repetitions In one non-limiting embodiment, dynamic indication of PUCCH repetition is only applied to PUCCH carrying HARQ-ACK.

In one non-limiting embodiment, if a UE is indicated by a DCI a PUCCH resource with certain PUCCH format containing a higher layer parameter indication of the repetition number, e.g., repetitionNum in PUCCH-Resource IE, and is configured with nrofSlots in PUCCH-FormatConfig for that PUCCH format, the UE ignores nrofSlots in PUCCH-FormatConfig and perform PUCCH repetition according to the indicated PUCCH resource.

Collision Handling

In one non-limiting embodiment, if PUCCH repetition associated with low priority UCI collides/overlap with another PUCCH (with or without repetitions) associated with high priority UCI (with the same or with different UCI types), the PUCCH repetitions with low priority UCI in the overlapped slots/sub-slots are dropped. The remaining non-overlapped PUCCH repetitions are still transmitted.

In one non-limiting embodiment, if PUCCH repetition associated with low priority UCI collides/overlap with a PUSCH transmission associated with high priority, the PUCCH repetitions with low priority UCI in the overlapped slots/sub-slots are dropped. The remaining non-overlapped PUCCH repetitions are still transmitted.

In one non-limiting embodiment, if a PUCCH repetition out of a set of more than one PUCCH repetitions overlaps with another UL transmission, and the PUCCH repetition is dropped, later PUCCH repetitions are also dropped. Reasons for dropping the PUCCH repetition could be that the other UL transmission is of higher priority, either physical layer priority or that of the UCI type, if any, on the other UL transmission is of higher priority.

In one non-limiting embodiment the other UL transmission is a PUCCH transmission.

In one non-limiting embodiment the other UL transmission is a PUSCH transmission.

Invalid Symbols for PUCCH Repetitions

For PUCCH repetitions, the UE determines invalid symbol(s) for PUCCH repetitions due to numerous reasons. In principle, any symbols that cannot be counted as available for uplink transmission are invalid for PUCCH repetitions. In the following, numerous scenarios that cause symbols unavailable for uplink transmission (hence unavailable for PUCCH repetitions) are described.

In one example, a symbol that is indicated as downlink by tdd-UL-DL-ConfigurationCommon or tdd-UL-DL-ConfigurationDedicated is considered as an invalid symbol for PUCCH repetitions.

In another example, for operation in unpaired spectrum, symbols indicated by ssb-PositionsInBurst in SIB1 or ssb-PositionsInBurst in ServingCellConfigCommon for reception of SS/PBCH blocks are considered as invalid symbols for PUCCH repetitions.

In another example, for operation in unpaired spectrum, symbol(s) indicated by pdcch-ConfigSIB1 in MIB for a CORESET for Type0-PDCCH CSS set are considered as invalid symbol(s) for PUCCH repetitions.

In another example, for operation in unpaired spectrum, if numberInvalidSymbolsForDL-UL-Switching is configured, numberInvalidSymbolsForDL-UL-Switching symbol(s) after the last symbol that is indicated as downlink in each consecutive set of all symbols that are indicated as downlink by tdd-UL-DL-ConfigurationCommon or tdd-UL-DL-ConfigurationDedicated are considered as invalid symbol(s) for PUCCH repetitions. The symbol(s) given by numberInvalidSymbolsForDL-UL-Switching are defined using the reference SCS configuration referenceSubcarrierSpacing provided in tdd-UL-DL-ConfigurationCommon.

In another example, if the UE
is configured with multiple serving cells and is configured to operate with half duplex (for example, half-duplex-behavior-r16='enable'), and
is not capable of simultaneous transmission and reception on any of the multiple serving cells, and indicates support of capability for half-duplex operation in Carrier Aggregation (CA) with unpaired spectrum, and is not configured to monitor PDCCH for detection of DCI format 2-0 on any of the multiple serving cells, then: a symbol is considered as an invalid symbol in any of the multiple serving cells for PUCCH repetitions if the symbol is indicated to the UE for reception of Synchronization Signal (SS)/Physical Broadcasting Channel (PBCH) blocks in any of the multiple serving cells by ssb-PositionsInBurst in SIB1 or ssb-PositionsInBurst in ServingCell-ConfigCommon.

In another example, a symbol is considered as an invalid symbol in any of the multiple serving cells for PUCCH repetitions if the UE is configured by higher layers to receive PDCCH, PDSCH, or Channel State Information Reference Signal (CSI-RS) on the reference cell in the symbol.

In another example, a symbol on a shared spectrum is considered as invalid if the UE has not obtained access to the channel, when required.

In another example, a symbol on a shared spectrum is considered as invalid if the symbol overlaps with the idle period corresponding to semi-static channel access procedure.

If a PUCCH repetition overlaps with any invalid symbols, then the overlapping PUCCH repetition cannot be transmitted as is.

(a) In one method, the PUCCH repetition overlapping with invalid symbol(s) is discarded. The remaining PUCCH repetitions are kept for potential transmission.

(b) In another method, the PUCCH repetition overlapping with invalid symbol(s) is delayed till the PUCCH repetition can be transmitted with n consecutive valid symbols within a slot. Here n is the duration of one PUCCH repetition counted in number of symbols. Subsequent PUCCH repetitions are delayed as well. In one variation, all PUCCH repetitions are transmitted, though delayed due to invalid symbols. In another variation, PUCCH repetitions are delayed and transmitted till a timing limit is reached.

PUCCH repetitions based on the UCI content: In one embodiment, the PUCCH repetitions are subjected to the information (or context) it withholds. For example, in case of HARQ feedback, if a UE sends ACK feedback then UE continues with X amount of repetition(s), and if UE responds with a Negative Acknowledgement (NACK) feedback then the UE delivers Y repetitions.

PUCCH repetitions based on PUCCH resource: In one embodiment, number of repetitions is configured per PUCCH resource and UCI type. For example, fields nrof-Repetitions-HARQ-ACK-rX, nrofRepetitions-CSI-rX and nrofRepetitions-SR-rX could be added (highlighted part) to RRC information element PUCCH-Resource, e.g.,

```
PUCCH-Resource :: =          SEQUENCE {
    pucch-ResourceId             PUCCH-ResourceId,
    startingPRB                  PRB-Id,
    intraSlotFrequencyHopping    ENUMERATED { enabled }
OPTIONAL, -- Need R
    secondHopPRB                 PRB-Id
OPTIONAL, -- Need R
    format                       CHOICE {
        format0                      PUCCH-format0,
        format1                      PUCCH-format1,
        format2                      PUCCH-format2,
        format3                      PUCCH-format3,
        format 4                     PUCCH-format4
```

-continued

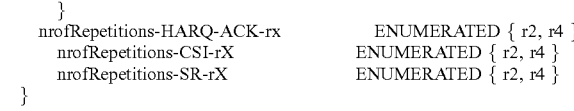

```
    }
    nrofRepetitions-HARQ-ACK-rx    ENUMERATED { r2, r4 }
    nrofRepetitions-CSI-rX         ENUMERATED { r2, r4 }
    nrofRepetitions-SR-rX          ENUMERATED { r2, r4 }
}
```

The example values r2 and r4 corresponds to 2 or 4 repetitions. In case of multiple UCI types the number of repetitions may equal to the max (or min) value indicated by {nrofRepetitions-HARQ-ACK-rX, nrofRepetitions-CSI-rX}, {{nrofRepetitions-HARQ-ACK-rX, nrofRepetitions-SR-rX}, {{nrofRepetitions-CSI-rX, nrofRepetitions-SR-rX} or {nrofRepetitions-HARQ-ACK-rX, nrofRepetitions-CSI-rX, nrofRepetitions-SR-rX} depending on UCI types included in UCI.

In some examples, nrofRepetitions-CSI-rX and nrofRepetitions-SRrX is replaced by nrofRepetitions-otherUCI-rX where nrofRepetitions-otherUCI-rX is used when UCI does not include HARQ-ACK.

In some examples the new "nrofRepetitions" fields are instead per priority index, e.g., two fields nrofRepetitions-zero-rX and nrofRepetitions-one-rX, are added instead wherein nrofRepetitions-one-rX is used if UCI contains priority index 1 UCI and nrofRepetitions-zero-rX otherwise. Extending to more priority levels 0, 1, 2, . . . , P−1 is possible by applying the rule that nrofRepetitions-p-rX for p in [0 . . . P−1] is applied if p is the highest priority index of the UCI contents.

In further other examples, "nrofRepetitions" can be per UCI type and priority index, e.g., for HARQ-ACK there are two parameters nrofRepetitions-HARQ-ACK-zero-rX and nrofRepetitions-HARQ-ACK-one-rX.

Other combining embodiments and/or variants are possible.

In the new fields are configured for a PUCCH resource, then the field nrofSlots is ignored for any PUCCH format that use said PUCCH resource. Conversely, if the field nrofRepetitions-rX is not configured, then legacy behavior is obtained.

PUCCH Repetition with Additional Diversity Features

In addition to repetition, other features can be incorporated to provide further diversity and robustness of PUCCH transmission.

PUCCH repetition over multiple Transmission/Reception Points (TRPs) on the UE side.

In this embodiment, the PUCCH repetitions are distributed over multiple TRPs on the UE side. When there are multiple TRPs on the UE side, the PUCCH repetition can be spread over the TRPs in Spatial Domain Multiplexing (SDM) manner, Frequency Domain Multiplexing (FDM) manner, or Time Domain Multiplexing (TDM) manner.

If SDM, the multiple TRPs transmit the multiple PUCCH repetitions over the same time-frequency resources at the same time. The transmissions over the multiple TRP are separated spatially.

If FDM, the multiple TRPs alternate over numerous frequency domain locations when transmitting the PUCCH repetitions. The PUCCH repetitions may be transmitted over the same set of symbols in the time-domain. For example, if there are two TRPs on the UE side, then the odd-indexed PUCCH repetitions are transmitted from a first TRP from a first set of frequency locations, and the even-indexed PUCCH repetitions are transmitted from a second TRP from a second set of frequency locations. The first and second set of frequency locations do not overlap.

If TDM, the multiple TRPs alternate over numerous time domain instances when transmitting the PUCCH repetitions. The PUCCH repetitions may be transmitted over the same set of frequency domain resources. For example, if there are two TRPs on the UE side, then the odd-indexed PUCCH repetitions are transmitted from a first TRP at a first set of time domain symbols, and the even-indexed PUCCH repetitions are transmitted from a second TRP at a second set of time domain symbols. The first and second sets of time domain symbols do not overlap.

PUCCH Repetition Over Multiple Beams

In this embodiment, the UE has identified two or more uplink beams that can be used for transmission. The multiple uplink beams may point to the multiple TRPs on the base station side, one beam for one base station TRP. The UE should have multiple antenna ports in order to form multiple beams, but the UE is not required to implement multiple TRPs.

For example, if two beams have been established via beam management, then the odd-indexed PUCCH repetitions are transmitted via a first beam, and the even-indexed PUCCH repetitions are transmitted via a second beam.

PUCCH Repetition with Frequency Hopping

In this embodiment, frequency hopping is used together with PUCCH repetition. If M frequency locations are configured for PUCCH frequency hopping, then the PUCCH repetitions spread out in time, and each PUCCH repetition takes turns to use one of the M frequency locations. In the preferred example, the M frequency locations are spaced out over the active bandwidth part evenly as much as possible.

Figure 9:
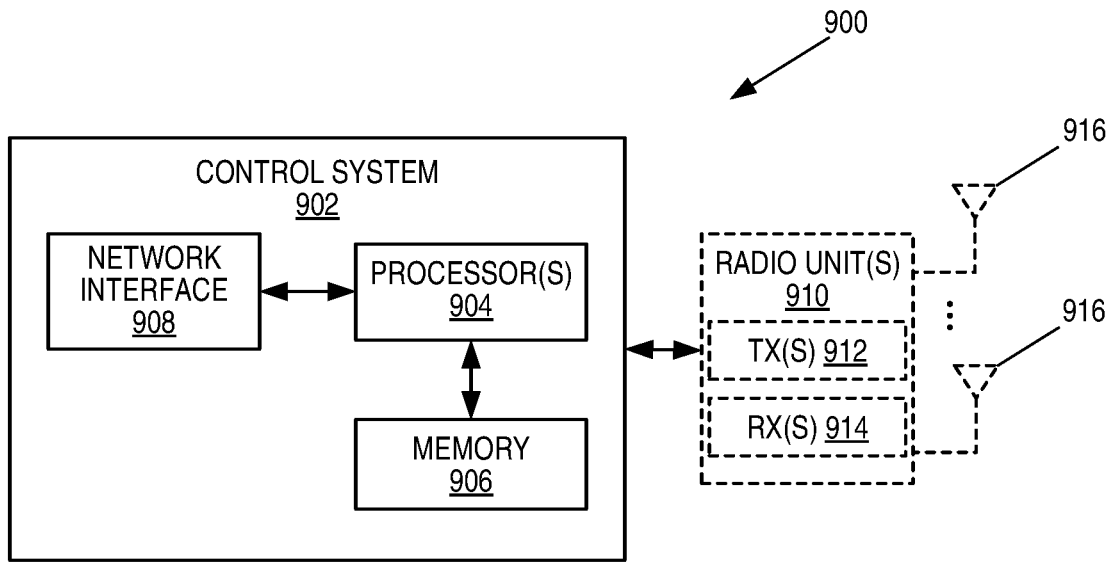
FIG. 9 is a schematic block diagram of a radio access node according to some embodiments of the present disclosure.

FIG. 9 is a schematic block diagram of a radio access node 900 according to some embodiments of the present disclosure. Optional features are represented by dashed boxes. The radio access node 900 may be, for example, a base station 602 or 606 or a network node that implements all or part of the functionality of the base station 602 or gNB described herein. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
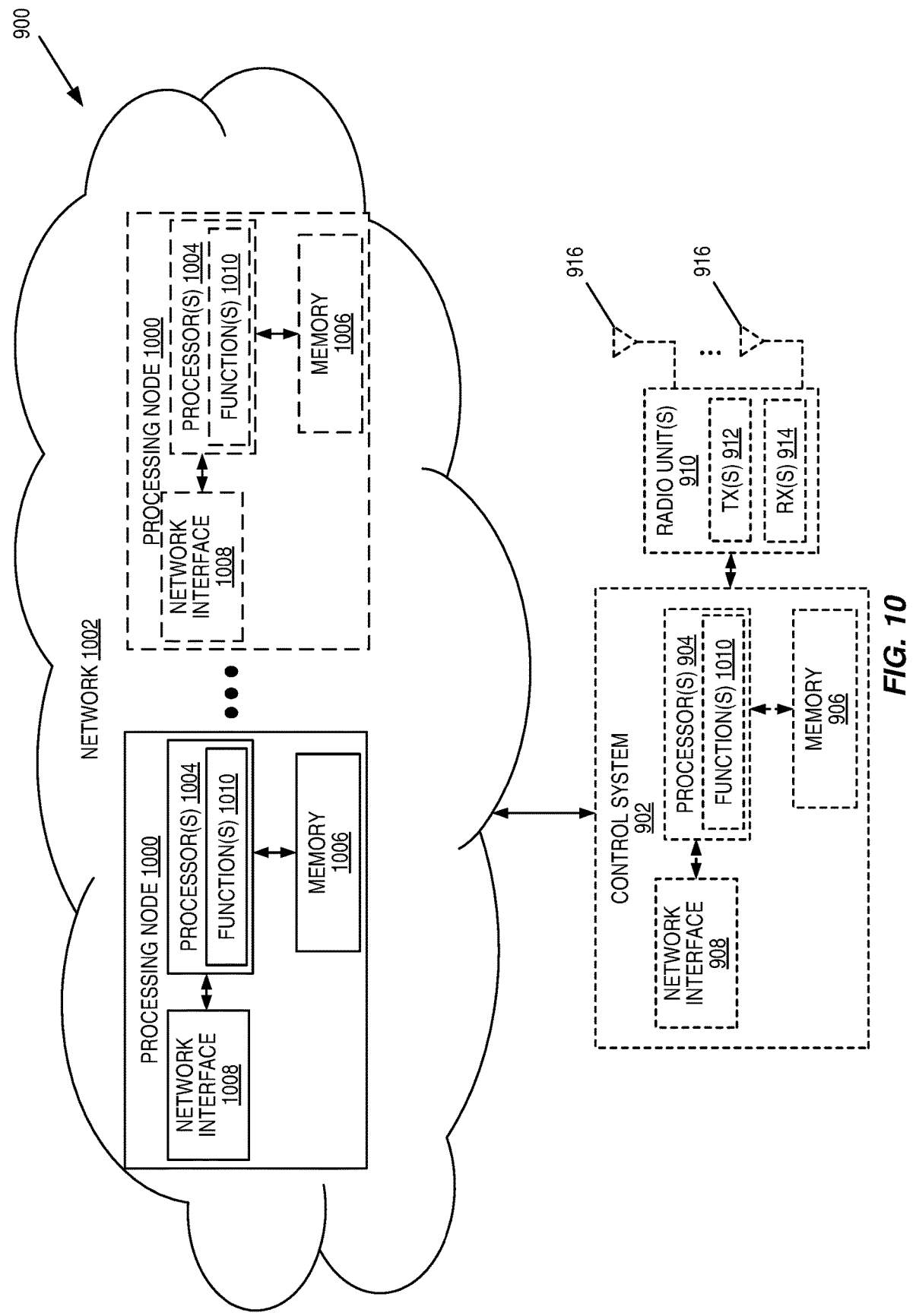
FIG. 10 is a schematic block diagram that illustrates a virtualized embodiment of the radio access node according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 may include the control system 902 and/or the one or more radio units 910, as described above. The control system 902 may be connected to the radio unit(s) 910 via, for example, an optical cable or the like. The radio access node 900 includes one or more processing nodes 1000 coupled to or included as part of a network(s) 1002. If present, the control system 902 or the radio unit(s) are connected to the processing node(s) 1000 via the network 1002. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the one or more processing nodes 1000 and the control system 902 and/or the radio unit(s) 910 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
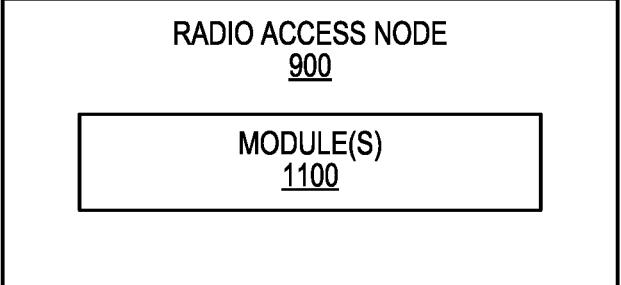
FIG. 11 is a schematic block diagram of the radio access node according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
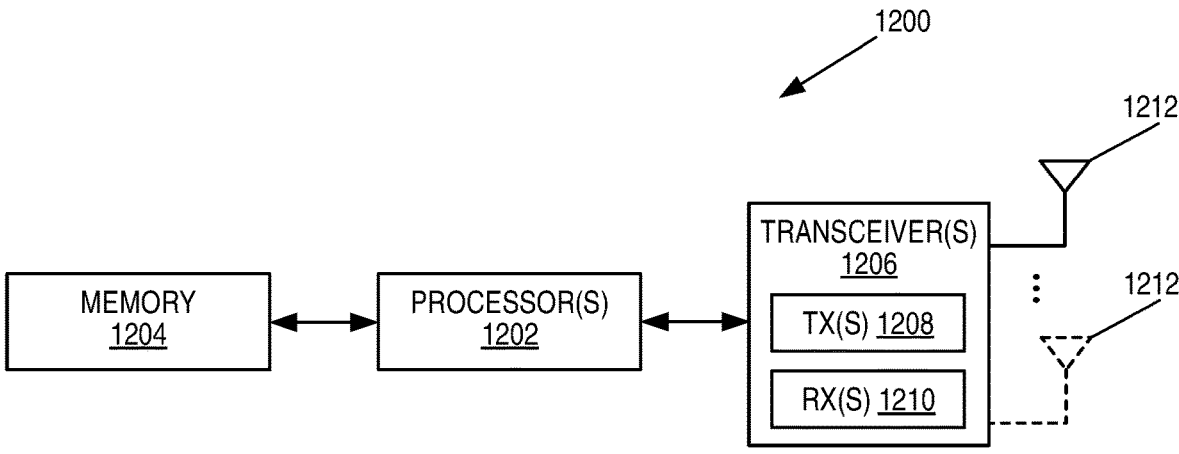
FIG. 12 is a schematic block diagram of a wireless communication device 1500 according to some embodiments of the present disclosure.

FIG. 12 is a schematic block diagram of a wireless communication device 1200 according to some embodiments of the present disclosure. As illustrated, the wireless communication device 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the wireless communication device 1200 described above may be fully or partially implemented in software that is, e.g., stored in the memory 1204 and executed by the processor(s) 1202. Note that the wireless communication device 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the wireless communication device 1200 and/or allowing output of information from the wireless communication device 1200), a power supply (e.g., a battery and associated power circuitry), etc.

In some embodiments, a computer program including instructions which, when executed by at least one processor, causes the at least one processor to carry out the functionality of the wireless communication device 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
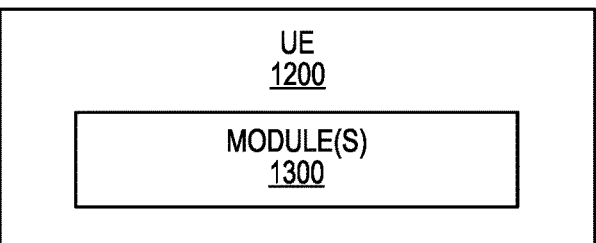
FIG. 13 is a schematic block diagram of the wireless communication device according to some other embodiments of the present disclosure.

FIG. 13 is a schematic block diagram of the wireless communication device 1200 according to some other embodiments of the present disclosure. The wireless communication device 1200 includes one or more modules 1300, each of which is implemented in software. The module(s) 1300 provide the functionality of the wireless communication device 1200 described herein.

Figure 14:
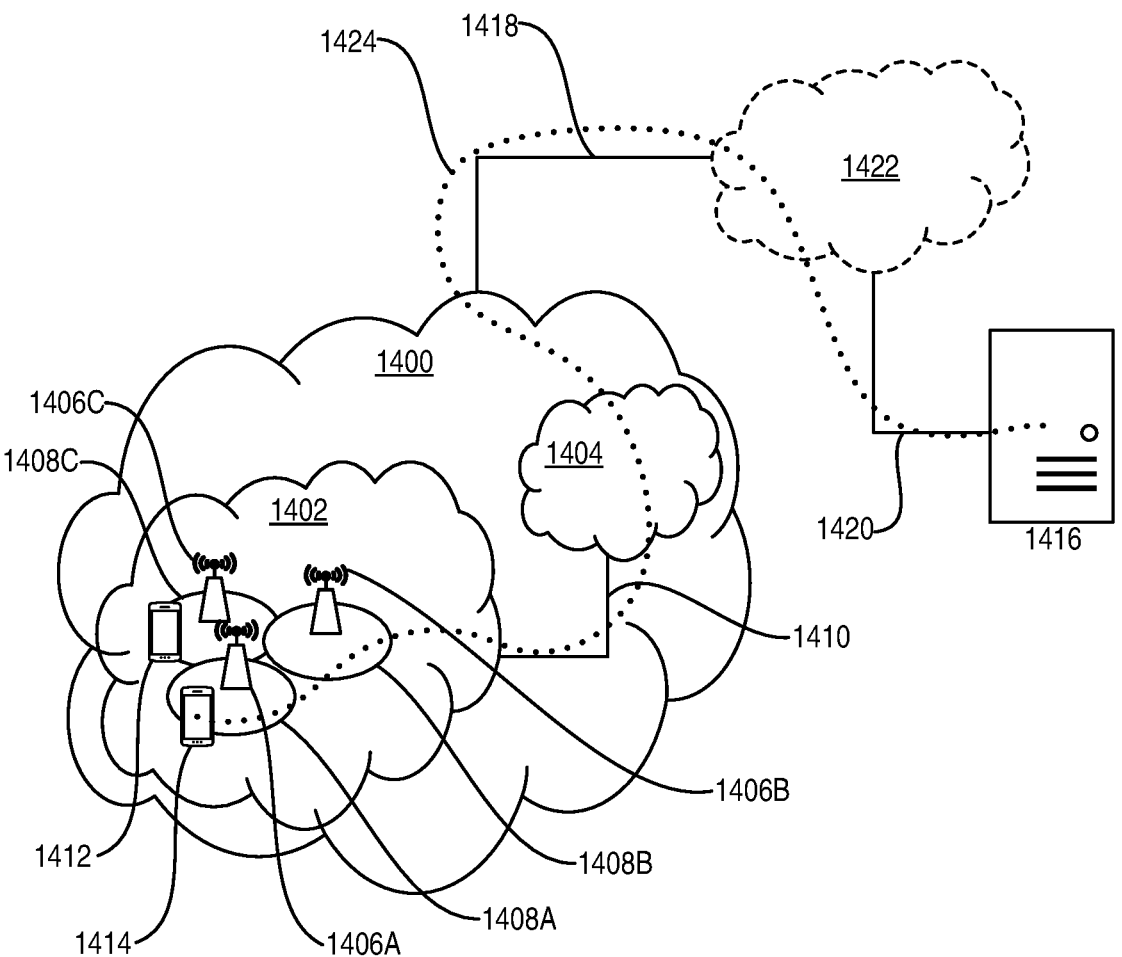
FIG. 14 illustrates a communication system includes a telecommunication network, such as a Third Generation Partnership Project (3GPP)-type cellular network, which comprises an access network, such as a Radio Access Network (RAN), and a core network according to some other embodiments of the present disclosure.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer

1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
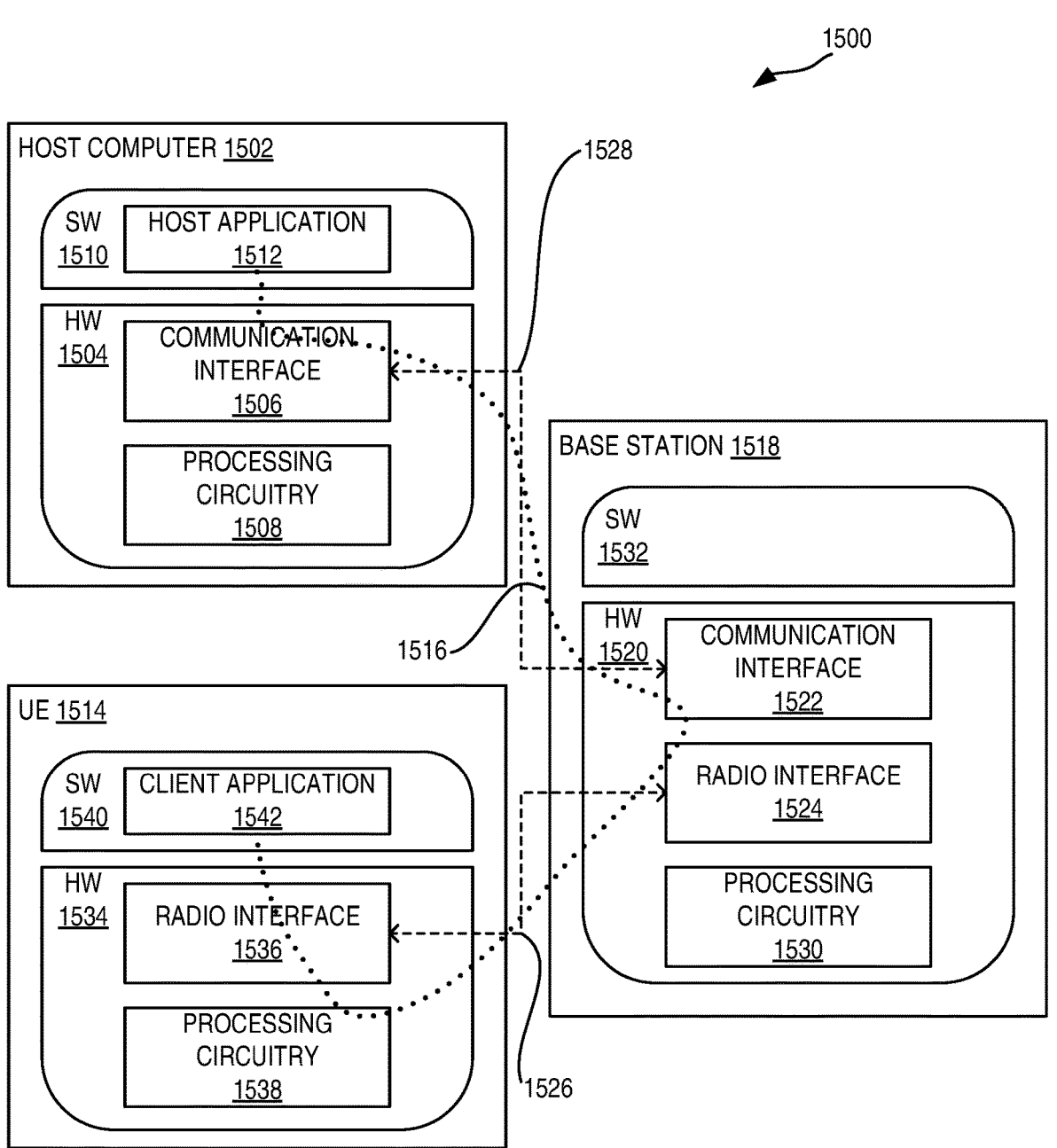
FIG. 15 illustrates a communication system, a host computer comprises hardware including a communication interface configured to set up and maintain a wired or wireless connection with an interface of a different communication device of the communication system according to some other embodiments of the present disclosure.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
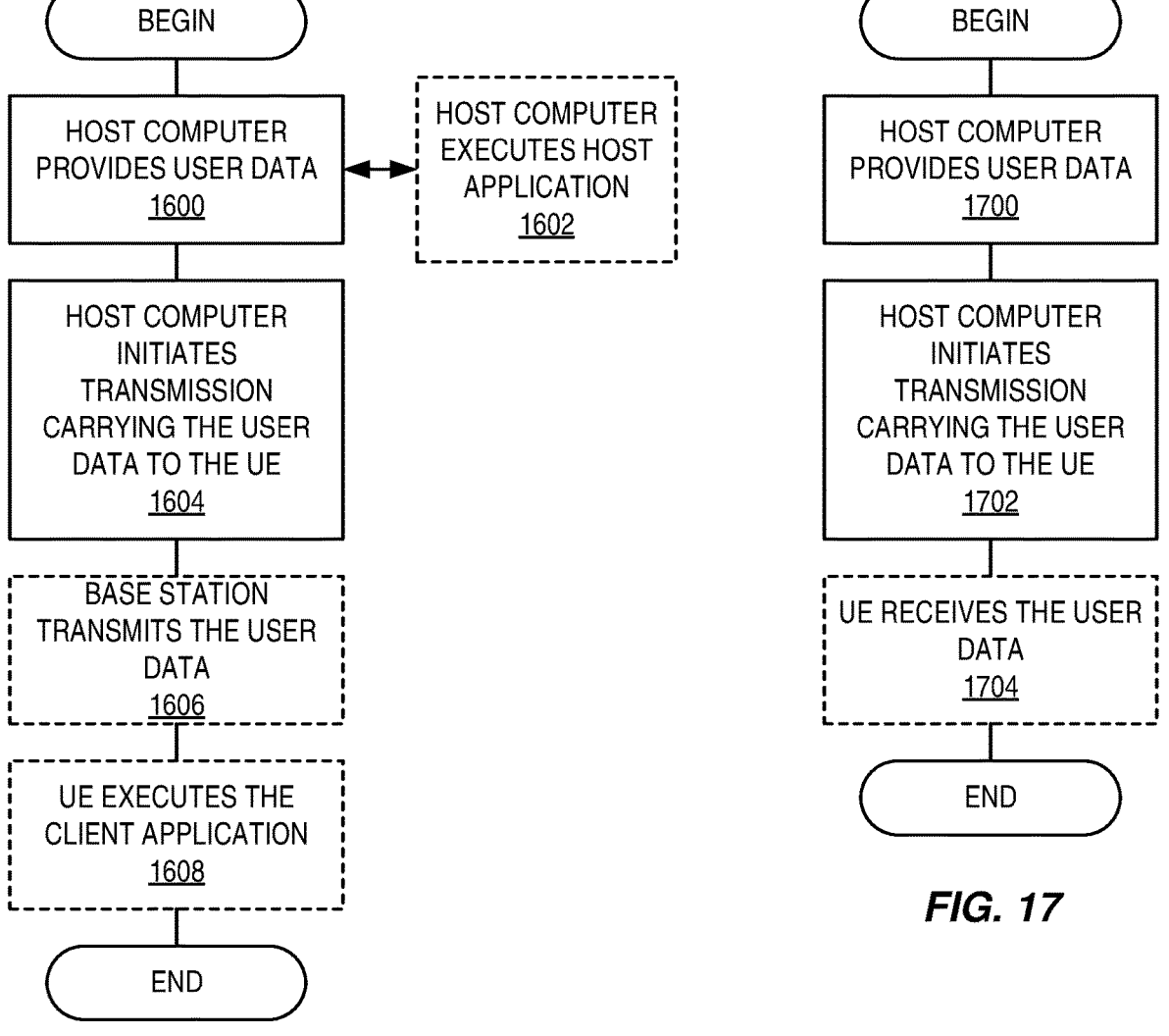
FIGS. 16 to 19 illustrate methods implemented in a communication system, according to some other embodiments of the present disclosure.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

Figures 18, 19:
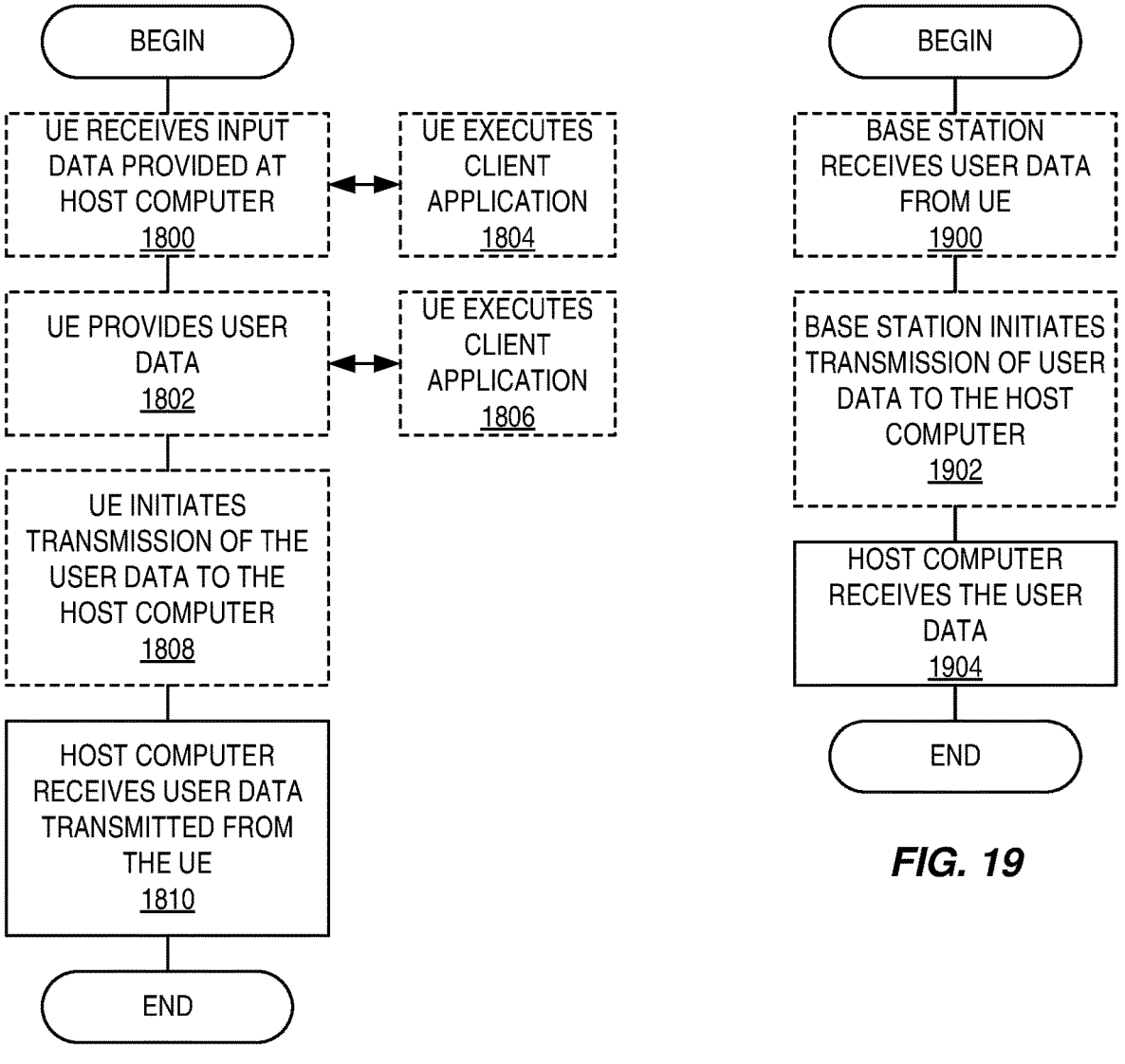

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method (700) performed by a wireless device for transmitting on a PUCCH, the method comprising one or more of: receiving (702) a configuration indicating PUCCH repetition; and transmitting (704) repeated PUCCH transmissions based on the configuration.

Embodiment 2: The method of embodiment 1 wherein the configuration includes one or more of: the number of repetitions, whether the repetition is based on UCI type, and whether the repetition is based on priority of the UCI.

Embodiment 3: The method of any of embodiments 1-2 wherein the configuration applies to one or more of: slot-based PUCCH and sub-slot based PUCCH.

Embodiment 4: The method of any of embodiments 1-3 wherein the configuration applies to one or more of: short PUCCH formats and long PUCCH formats.

Embodiment 5: The method of any of embodiments 1-4 wherein the configuration can include a new higher layer (e.g., RRC) parameters for PUCCH repetition for each UCI type separately.

Embodiment 6: The method of any of embodiments 1-5 wherein, if more than one parameter is configured with different values for the number of repetitions, PUCCH repetition for PUCCH carrying multiple UCI types is performed according to the largest value.

Embodiment 7: The method of any of embodiments 1-5 wherein, if more than one parameter is configured with different values for the number of repetitions, PUCCH repetition for PUCCH carrying multiple UCI types is performed according to the smallest value.

Embodiment 8: The method of any of embodiments 1-7 wherein the unit of the values of parameters can be slot or sub-slot.

Embodiment 9: The method of any of embodiments 1-8 wherein there is a predefined restriction where only certain PUCCH formats are applied, e.g., only long PUCCH formats 1, 3, or Embodiment 4:

Embodiment 10: The method of any of embodiments 1-9 wherein the parameter for PUCCH repetition for certain UCI type also indicates the applicable PUCCH format(s).

Embodiment 11: The method of any of embodiments 1-10 wherein PUCCH repetition for UCI type with the number of repetitions is performed based on an implicit rule.

Embodiment 12: The method of any of embodiments 1-11 wherein PUCCH repetition is associated to low priority or high priority, and PUCCH repetition can be determined based on a default rule or indicated by higher layers (e.g., the priority is indicated in the DCI scheduling the UCI).

Embodiment 13: The method of any of embodiments 1-12 wherein, if PUCCH repetition associated with low priority UCI collides/overlaps with another PUCCH associated with high priority UCI, the PUCCH repetitions with low priority UCI in the overlapped slots/sub-slots are dropped.

Embodiment 14: The method of any of the previous embodiments, further comprising: providing user data; and forwarding the user data to a host computer via the transmission to the base station.

Group B Embodiments

Embodiment 15: A method (800) performed by a base station for configuring PUCCH transmissions, the method comprising: transmitting (802) a configuration indicating PUCCH repetition; and receiving (804) repeated PUCCH transmissions based on the configuration.

Embodiment 16: The method of embodiment 15 wherein the configuration includes one or more of: the number of repetitions, whether the repetition is based on UCI type, and whether the repetition is based on priority of the UCI.

Embodiment 17: The method of any of embodiments 15-16 wherein the configuration applies to one or more of: slot-based PUCCH and sub-slot based PUCCH.

Embodiment 18: The method of any of embodiments 15-17 wherein the configuration applies to one or more of: short PUCCH formats and long PUCCH formats.

Embodiment 19: The method of any of embodiments 15-18 wherein the configuration can include a new higher layer (e.g., RRC) parameters for PUCCH repetition for each UCI type separately.

Embodiment 20: The method of any of embodiments 15-19 wherein, if more than one parameter is configured with different values for the number of repetitions, PUCCH repetition for PUCCH carrying multiple UCI types is performed according to the largest value.

Embodiment 21: The method of any of embodiments 15-19 wherein, if more than one parameter is configured with different values for the number of repetitions, PUCCH repetition for PUCCH carrying multiple UCI types is performed according to the smallest value.

Embodiment 22: The method of any of embodiments 15-21 wherein the unit of the values of parameters can be slot or sub-slot.

Embodiment 23: The method of any of embodiments 15-22 wherein there is a predefined restriction where only certain PUCCH formats are applied, e.g., only long PUCCH formats 1, 3, or Embodiment 4:

Embodiment 24: The method of any of embodiments 15-23 wherein the parameter for PUCCH repetition for certain UCI type also indicates the applicable PUCCH format(s).

Embodiment 25: The method of any of embodiments 15-24 wherein PUCCH repetition for UCI type with the number of repetitions is performed based on an implicit rule.

Embodiment 26: The method of any of embodiments 15-25 wherein PUCCH repetition is associated to low priority or high priority, and PUCCH repetition can be determined based on a default rule or indicated by higher layers (e.g., the priority is indicated in the DCI scheduling the UCI).

Embodiment 27: The method of any of embodiments 15-26 wherein, if PUCCH repetition associated with low priority UCI collides/overlaps with another PUCCH (with or without repetition) associated with high priority UCI (could be same or different UCI types), the PUCCH repetitions with low priority UCI in the overlapped slots/sub-slots are dropped.

Embodiment 28: The method of any of the previous embodiments, further comprising: obtaining user data; and forwarding the user data to a host computer or a wireless device.

Group C Embodiments

Embodiment 29: A wireless device for transmitting on a PUCCH, the wireless device comprising: processing circuitry configured to perform any of the steps of any of the Group A embodiments; and power supply circuitry configured to supply power to the wireless device.

Embodiment 30: A base station for configuring PUCCH transmissions, the base station comprising: processing circuitry configured to perform any of the steps of any of the Group B embodiments; and power supply circuitry configured to supply power to the base station.

Embodiment 31: A User Equipment, UE, for transmitting on a PUCCH, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 32: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 33: The communication system of the previous embodiment further including the base station.

Embodiment 34: The communication system of the previous 2 embodiments, further including the UE, wherein the UE is configured to communicate with the base station.

Embodiment 35: The communication system of the previous 3 embodiments, wherein: the processing circuitry of the host computer is configured to execute a host application, thereby providing the user data; and the UE comprises processing circuitry configured to execute a client application associated with the host application.

Embodiment 36: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 37: The method of the previous embodiment, further comprising, at the base station, transmitting the user data.

Embodiment 38: The method of the previous 2 embodiments, wherein the user data is provided at the host computer by executing a host application, the method further comprising, at the UE, executing a client application associated with the host application.

Embodiment 39: A User Equipment, UE, configured to communicate with a base station, the UE comprising a radio interface and processing circuitry configured to perform the method of the previous 3 embodiments.

Embodiment 40: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 41: The communication system of the previous embodiment, wherein the cellular network further includes a base station configured to communicate with the UE.

Embodiment 42: The communication system of the previous 2 embodiments, wherein: the processing circuitry of the host computer is configured to execute a host application, thereby providing the user data; and the UE's processing circuitry is configured to execute a client application associated with the host application.

Embodiment 43: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 44: The method of the previous embodiment, further comprising at the UE, receiving the user data from the base station.

Embodiment 45: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 46: The communication system of the previous embodiment, further including the UE.

Embodiment 47: The communication system of the previous 2 embodiments, further including the base station, wherein the base station comprises a radio interface configured to communicate with the UE and a communication interface configured to forward to the host computer the user data carried by a transmission from the UE to the base station.

Embodiment 48: The communication system of the previous 3 embodiments, wherein: the processing circuitry of the host computer is configured to execute a host application; and the UE's processing circuitry is configured to execute a client application associated with the host application, thereby providing the user data.

Embodiment 49: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 50: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 51: The method of the previous embodiment, further comprising, at the UE, providing the user data to the base station.

Embodiment 52: The method of the previous 2 embodiments, further comprising: at the UE, executing a client application, thereby providing the user data to be transmitted; and at the host computer, executing a host application associated with the client application.

Embodiment 53: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 54: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 55: The communication system of the previous embodiment further including the base station.

Embodiment 56: The communication system of the previous 2 embodiments, further including the UE, wherein the UE is configured to communicate with the base station.

Embodiment 57: The communication system of the previous 3 embodiments, wherein: the processing circuitry of the host computer is configured to execute a host application; and the UE is configured to execute a client application associated with the host application, thereby providing the user data to be received by the host computer.

Embodiment 58: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 59: The method of the previous embodiment, further comprising at the base station, receiving the user data from the UE.

Embodiment 60: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

Those skilled in the art will recognize improvements and modifications to the embodiments of the present disclosure. All such improvements and modifications are considered within the scope of the concepts disclosed herein.

The invention claimed is:

1. A method performed by a wireless device for transmitting on a Physical Uplink Control Channel (PUCCH) the method comprising:

receiving a configuration indicating PUCCH repetition based on Uplink Control Information (UCI) type, the configuration including a high layer parameter for PUCCH repetition to each UCI type separately, each high layer parameter indicating a number of repetitions for the corresponding UCI type; and transmitting repeated PUCCH transmissions based on the configuration, wherein, if more than one parameter is configured with different values for the number of repetitions, PUCCH repetition for PUCCH carrying multiple UCI types is performed according to the largest value.

2. The method of claim 1 wherein the configuration further includes one or more of:

a number of repetitions, and whether the repetition is based on priority of the UCI.

3. The method of claim 1 wherein the configuration applies to slot-based PUCCH and sub-slot based PUCCH.

4. The method of claim 1 wherein the configuration applies to short PUCCH formats and long PUCCH formats.

5. The method of claim 1 wherein the configuration can include a new higher layer parameter for PUCCH repetition for each UCI type separately.

6. The method of claim 1 wherein, if more than one parameter is configured with different values for a number of repetitions, PUCCH repetition for PUCCH carrying multiple UCI types is performed according to the smallest value.

7. The method of claim 1 wherein a unit of values of parameters can be slot or sub-slot.

8. The method of claim 1 wherein there is a predefined restriction where only certain PUCCH formats are applied.

9. The method of claim 1 wherein a parameter for PUCCH repetition for certain UCI type also indicates applicable PUCCH formats.

10. The method of claim 1 wherein PUCCH repetition for UCI type with a number of repetitions is performed based on an implicit rule.

11. The method of claim 1 wherein PUCCH repetition is associated to low priority or high priority, and PUCCH repetition can be determined based on a default rule or indicated by higher layers.

12. The method of claim 1 wherein, if PUCCH repetition associated with low priority UCI overlaps with another PUCCH associated with high priority UCI, the PUCCH repetitions with low priority UCI in overlapped slots/sub-slots are dropped.

13. The method of claim 1 wherein the wireless device operates in a New Radio (NR) network.

14. A method performed by a base station for configuring Physical Uplink Control Channel (PUCCH) transmissions, the method comprising:

transmitting a configuration indicating PUCCH repetition, wherein the configuration includes whether the repetition is based on Uplink Control Information (UCI) type; and receiving repeated PUCCH transmissions based on the configuration, wherein, if more than one parameter is configured with different values for the number of repetitions, PUCCH repetition for PUCCH carrying multiple UCI types is performed according to the largest value.

15. The method of claim 14 wherein the configuration further includes a number of repetitions and whether the repetition is based on priority of the UCI.

16. The method of claim 14 wherein the configuration applies to slot-based PUCCH and sub-slot based PUCCH.

17. The method of claim 14 wherein the configuration applies to short PUCCH formats and long PUCCH formats.

18. The method of claim 14 wherein the configuration can include a new higher layer parameters for PUCCH repetition for each UCI type separately.

19. A wireless device for transmitting on a Physical Uplink Control Channel (PUCCH) comprising:

one or more transmitters;

one or more receivers; and processing circuitry associated with the one or more transmitters and the one or more receivers, the processing circuitry configured to cause the wireless device to:

receive a configuration indicating PUCCH repetition based on Uplink Control Information (UCI) type, the configuration including a high layer parameter for PUCCH repetition to each UCI type separately, each high layer parameter indicating a number of repetitions for the corresponding UCI type; and transmit repeated PUCCH transmissions based on the configuration, wherein the configuration includes whether the repetition is based on Uplink Control Information (UCI) type, wherein, if more than one parameter is configured with different values for the number of repetitions, PUCCH repetition for PUCCH carrying multiple UCI types is performed according to the largest value.

\* \* \* \* \*